United States Patent
Niedospial, Jr. et al.

[11] Patent Number: 5,295,635
[45] Date of Patent: Mar. 22, 1994

[54] SPOOL TO FILM ATTACHMENT

[75] Inventors: John J. Niedospial, Jr., Princeton Junction, N.J.; Russell J. Butler, Dansville; Christopher P. McCormick, Rochester, both of N.Y.

[73] Assignee: Eastman Kodak Company, Rochester, N.Y.

[21] Appl. No.: 936,476

[22] Filed: Aug. 28, 1992

[51] Int. Cl.$^5$ .............................................. B65H 75/28
[52] U.S. Cl. ........................................ 242/74; 242/71.8
[58] Field of Search ...................... 242/71, 71.1, 71.8, 242/74; 354/275, 277

[56] References Cited

U.S. PATENT DOCUMENTS

| | | | |
|---|---|---|---|
| 2,477,010 | 7/1949 | Schmidt | 242/74 |
| 3,481,552 | 12/1969 | Gersch et al. | 242/71.1 |
| 3,791,605 | 2/1974 | Blank et al. | 242/74 |
| 4,181,271 | 1/1980 | Kluczynski et al. | 242/74 |
| 4,239,164 | 12/1980 | Barnsbee et al. | 242/55.53 |
| 4,445,770 | 5/1984 | Morse | 354/275 X |
| 4,930,712 | 6/1990 | Smart | 242/74 |

FOREIGN PATENT DOCUMENTS

| | | |
|---|---|---|
| 0045428 | 2/1982 | European Pat. Off. |
| 0095148 | 11/1983 | European Pat. Off. |
| 0186824 | 7/1986 | European Pat. Off. |
| 2538425 | 3/1977 | Fed. Rep. of Germany |

Primary Examiner—Daniel P. Stodola
Assistant Examiner—Eileen Dunn
Attorney, Agent, or Firm—Roger A. Fields

[57] ABSTRACT

A spool to film attachment comprises a filmstrip having an engagement hole formed in a rear end of the filmstrip proximate a rearmost film edge and a spool having an engagement projection adapted to be received in the film hole. The projection has a pointed side oriented to face the rearmost film edge from within the film hole, when the projection is received in the film hole, to be able to tear at a predetermined point through a relatively narrow section of the filmstrip between the film hole and the rearmost film edge in response to pulling the rear end of the filmstrip away from the projection.

6 Claims, 3 Drawing Sheets

SPOOL TO FILM ATTACHMENT

BACKGROUND OF THE INVENTION

1. The invention relates generally to the field of photography, and in particular to a spool to film attachment.

2. Description of the Prior Art

Various known means exist for attaching a rear end of a filmstrip to the core or hub of a film spool onto which the filmstrip is intended to be wound. For example, the core of a film spool can have a slit for receiving the rear end of the filmstrip to anchor the rear end. Alternatively, a piece of adhesive tape can be used to secure the rear end of the filmstrip to the core of the film spool.

More specifically, prior art European Patent Application number 0 095 148 A2, published Nov. 30, 1983, discloses a spool to film attachment comprising a filmstrip having an oval-shaped engagement hole formed in a rear end of the filmstrip proximate a rearmost straight edge of the filmstrip and a film spool having an engagement pawl which projects from the core of the spool to be received in the film hole.

Problem to be Solved by the Invention

The difficulty with prior art devices, such as disclosed in European Patent Application number 0 095 148 A2, is that when the rear end of the filmstrip is forcibly separated from the core of the film spool some film tearing can result at various random locations, possibly leaving small pieces of film debris.

SUMMARY OF THE INVENTION

A spool to film attachment comprising a filmstrip having an engagement hole formed in a rear end of the filmstrip proximate a rearmost film edge and a spool having an engagement projection adapted to be received in the film hole, is characterized in that:

the projection has a pointed side oriented to face the rearmost film edge from within the film hole, when the projection is received in the film hole, to be able to tear at a predetermined point through a relatively narrow section of the filmstrip between the film hole and the rearmost film edge in response to pulling the rear end of the filmstrip away from the projection.

According to the invention, controlling the location at which the filmstrip is torn to disengage the rear end of the filmstrip from the spool will reduce the possibility of leaving small pieces of film debris.

DETAILED DESCRIPTION OF THE PREFERRED EMBODIMENT

Figure 1:
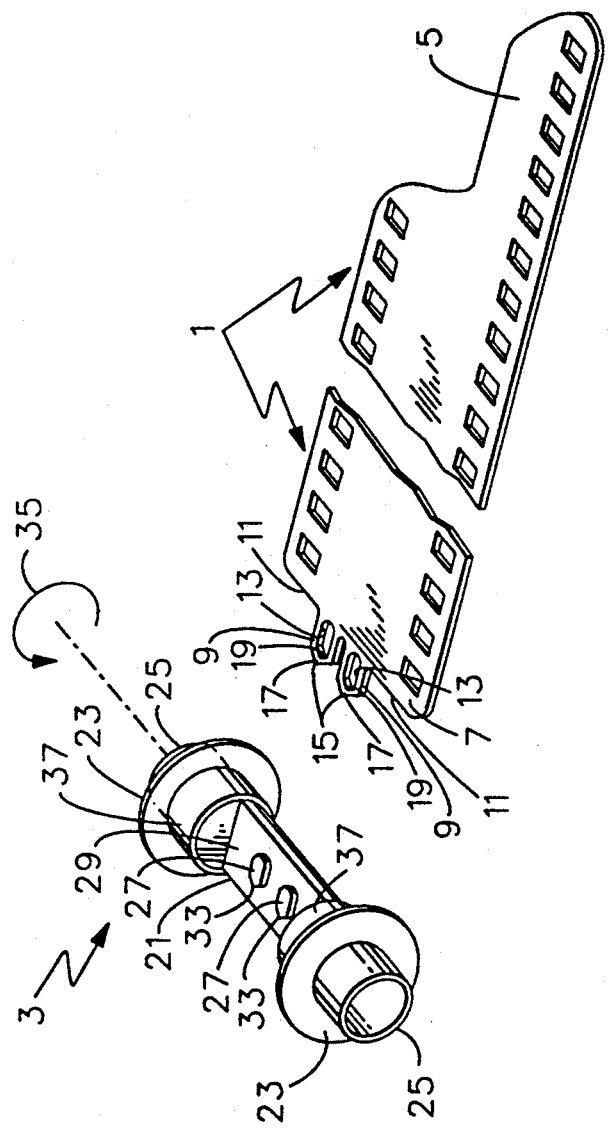
FIG. 1 is a perspective view of a film spool and a filmstrip including a spool to film attachment according to a preferred embodiment of the invention.

Referring now to the drawings, FIG. 1 depicts a 35 mm filmstrip 1 capable of being wound onto a film spool 3. The film spool 3 preferably is a component of a 35 mm film cartridge such as disclosed in commonly assigned U.S. Pat. No. 5,111,229, being rotatably supported inside the cartridge housing. Alternatively, the film spool 3 could serve as a film take-up spool in a camera. A front or leading end 5 of the filmstrip 1 is narrowed widthwise as is conventional, and a rear or trailing end 7 of the filmstrip is intended to be attached to the film spool 3 preparatory to winding the filmstrip onto the spool.

Figure 3:
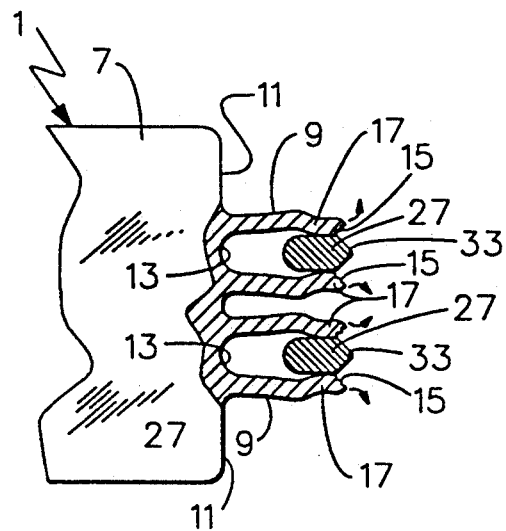
FIGS. 3 and 4 are plan views similar to FIG. 2, showing how the filmstrip is torn at a predetermined point when it is separated from the film spool.

The rear end 7 of the filmstrip 1 includes an identical pair of parallel-spaced, finger-like extensions 9, 9 which stand out from a rear shoulder 11 of the filmstrip 1 as shown in FIGS. 1 and 3. Each of the film extensions 9, 9 has a central engagement hole 13 proximate a rearmost film edge 15 of the film extension. Relatively narrow film sections 17, 17 between the film holes 13, 13 and the rearmost film edges 15, 15 have respective inside edges 19, 19 at the film holes with individual pointed contours that face in the same direction as similar individual contours of the rearmost film edges. See FIG. 3.

The film spool 3 comprises a winding core or hub 21 and a pair of identical flanges 23, 23 coaxially fixed to the core close to opposite ends 25, 25 of the core as shown in FIG. 1. A pair of identical engagement projections 27, 27 stand out from a flat surface 29 of the core 21 to be received in the film holes 13 to attach the rear film end 7 to the core See FIGS. 2 and 5. Each of the engagement projections 27, 27 has a slight undercut 31 to prevent the rear film end 7 from falling off the projection, a pointed side 33 (including one side of the undercut) shaped to fit within the pointed contour of one of the inside film edges 19, 19 and a width W that is about twice as great as the width ½ W of the narrow film sections 17, 17.

Figure 2:
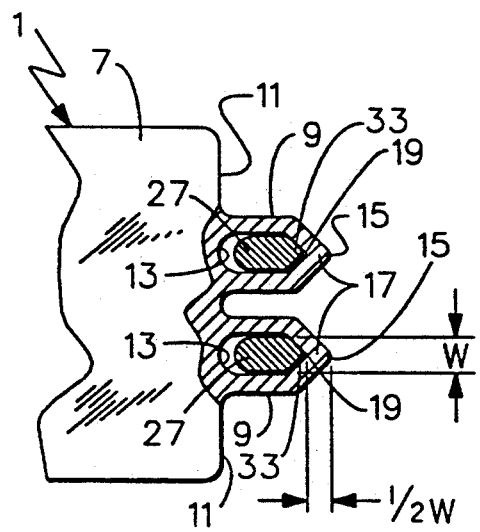
FIG. 2 is a plan view partly in section of the filmstrip and two engagement projections of the film spool, showing the engagement projections received in respective film holes to attach the filmstrip to the film spool.
Figure 4:
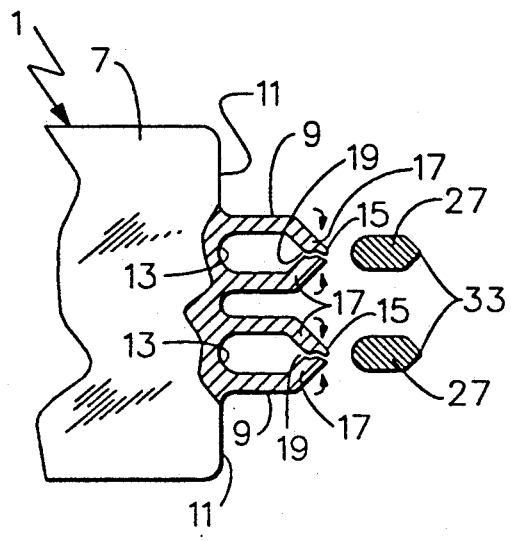
Figure 5:
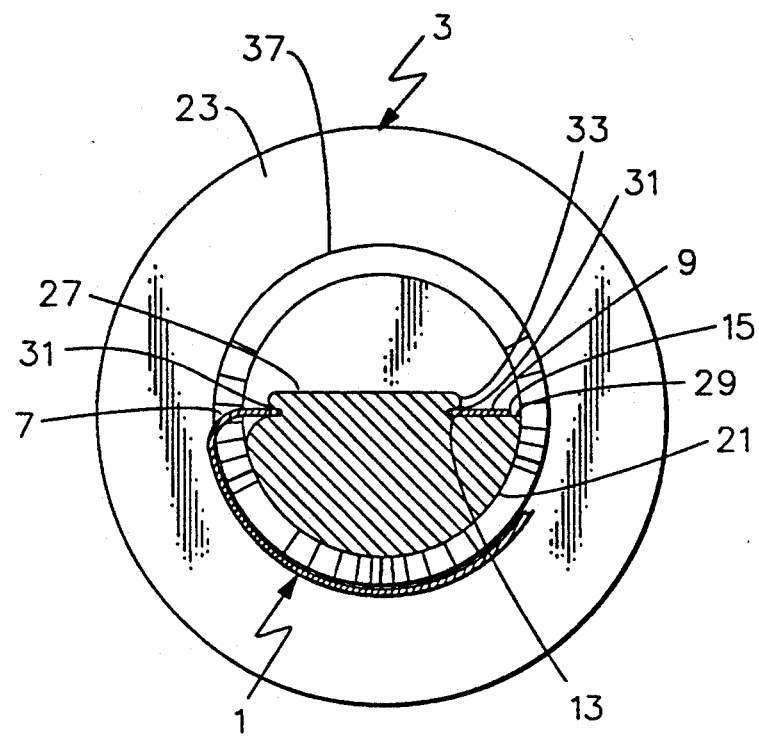
FIG. 5 is a cross-section view of the filmstrip and the film spool.

Once the engagement projections 27 are received in the film holes 13 to attach the rear film end 7 to the core 21 as shown in FIGS. 2 and 5, the film spool 3 can be rotated in a winding direction indicated by the arrowhead 35 in FIG. 1 to wind the filmstrip 1 beginning with its rear end 7 onto a pair of identical round surfaces 37, 37 of the core inwardly adjacent the flanges 23. If the filmstrip 1 is wound off the core 21, except for the film extensions 9, 9 of the rear film end 7, and the rear film end is pulled away from the engagement projections 27, 27, i.e. to the left in FIGS. 3 and 4, the pointed sides 33, 33, of the projections will at respective predetermined points along the inside film edges 19, 19 tear through the narrow film sections 17, 17 as indicated in FIGS. 3 and 4.

The invention has been described with reference to a preferred embodiment. However, it will be appreciated that variations and modifications can be effected within the ordinary skill in the art without departing from the scope of the invention.

We claim:

1. A spool for a filmstrip comprising an engagement projection adapted to be received in an engagement film hole formed in a rear end of the filmstrip to attach the rear end to said spool, is characterized in that:

said projection has a pointed side oriented to face a rearmost edge of the filmstrip from within the film hole, when the projection is received in the film hole, to be able to tear at a predetermined point through a relatively narrow film section between the film hole and the rearmost film edge in response to pulling the rear end of the filmstrip away from the projection.

2. A spool and a filmstrip comprising an engagement film hole formed in a rear end of said filmstrip proximate a rearmost film edge of the filmstrip, and an engagement projection of said spool adapted to be received in said film hole, is characterized in that:

said projection has a pointed side oriented to face said rearmost film edge from within said film hole, when the projection is received in the film hole, to be able to tear at a predetermined point through a relatively narrow section of said filmstrip between the film hole and the rearmost film edge in response to pulling said rear end of the filmstrip away from the projection.

3. A spool and a filmstrip as recited in claim 2, wherein said narrow film section has an inside edge at said film hole with a pointed contour which is complementary shaped to mate with said pointed side of the projection when said projection is received in the film hole.

4. A spool and a filmstrip as recited in claim 3, wherein said rearmost film edge has a pointed contour which faces in the same direction as said pointed side of the projection when said projection is received in said film hole.

5. A filmstrip comprising an engagement film hole formed in a rear end of said filmstrip proximate a rearmost film edge for receiving an engagement projection of a spool to attach said rear end to the spool, is characterized in that:

a relatively narrow section of said filmstrip between said film hole and said rearmost film edge has an inside edge at the film hole with a pointed contour pointing towards the rearmost film edge to mate with a pointed side of the engagement projection when the projection is received in the film hole.

6. A filmstrip as recited in claim 5, wherein said rearmost film edge has a pointed contour which faces in the same direction as said pointed contour of the inside film edge at said film hole.

* * * * *